United States Patent [19]
Carlson et al.

[11] Patent Number: 5,695,398
[45] Date of Patent: Dec. 9, 1997

[54] FOLDABLE LOADING AUGER

[75] Inventors: Timothy Harold Carlson; Douglas Arthur Voltz, both of Geneseo, Ill.

[73] Assignee: Deere & Company, Moline, Ill.

[21] Appl. No.: 668,186

[22] Filed: Jun. 21, 1996

[51] Int. Cl.⁶ .............................. A01F 12/46; A01F 12/60
[52] U.S. Cl. .............................. 460/114; 460/119; 414/505
[58] Field of Search .................... 460/119, 114, 460/116, 11, 150; 414/502, 505, 526

[56] References Cited

U.S. PATENT DOCUMENTS

| 3,938,683 | 2/1976 | Bichel. | |
|---|---|---|---|
| 4,029,228 | 6/1977 | Shaver. | |
| 4,072,242 | 2/1978 | Cook | 414/505 |
| 4,106,649 | 8/1978 | Nelson et al.. | |
| 4,408,947 | 10/1983 | Lenski et al.. | |
| 4,427,105 | 1/1984 | Hawley et al.. | |
| 4,583,905 | 4/1986 | Scherr. | |
| 4,669,945 | 6/1987 | Pollard et al. | 414/505 |
| 5,013,208 | 5/1991 | Grieshop. | |

FOREIGN PATENT DOCUMENTS

| 5015245 | 1/1993 | Japan | 460/114 |
|---|---|---|---|
| 6292447 | 10/1994 | Japan | 460/114 |

*Primary Examiner*—Terry Lee Melius

[57] ABSTRACT

A combine loading auger comprising a tube having auger flighting located therein. The tube is hinged to a transition housing containing the loading auger sump and held in place by two over-center latches. A first portion of each latch is coupled to the tube and the second portion of each latch is coupled to the loading auger. The transition housing is provided with a gear box drive for driving the auger flighting in the tube. The drive and flighting are provided with a coupling for transmitting rotational motion from the drive to the flighting. The coupling automatically disengages when the tube is lowered into its transport position, and automatically engages when the tube is raised into its working position. The coupling comprises a pair of axially extending engagement lugs mounted on the auger flighting and a pair of radially extending lugs mounted on the gearbox drive. The tube is also provided with a rest which engages a shelf formed by an unloading cross auger housing in the grain tank when the loading auger is placed into its transport position.

10 Claims, 3 Drawing Sheets

FOLDABLE LOADING AUGER

BACKGROUND

1. Field of the Invention

The present invention is directed to a foldable loading auger for an agricultural combine.

2. Description of the Prior Art

Combines are large agricultural machines used to harvest, thresh, separate, clean and temporarily store grain. The grain is harvested by a harvesting unit and directed to a feederhouse which directs the harvested crop into the combine. The harvested crop is threshed to remove the grain from the other crop material. Grain and chaff collected during the threshing operation are directed to the cleaning system. The threshed crop is then separated to further remove grain and chaff trapped in the crop material. The grain and chaff from the separating system is also directed to the cleaning system. The cleaning system uses a blower to remove the chaff from the grain and collects the clean grain at the bottom of the combine. A cross auger conveyor directs the clean grain to the side of the combine having a clean grain elevator. The elevator lifts the clean grain to a transition housing containing a loading auger sump. The transition housing is located adjacent to the grain tank. A loading auger projects upwardly from the loading auger sump to the center of the grain tank. The loading auger directs the clean grain into the grain tank where it is temporarily stored until removed by an unloading auger assembly.

Loading augers usually extend upwardly above the walls of the grain tank and are the highest point of the combine. As combines have grown larger it has become more important to lower the transportation profile of the combine so that it can be transported more easily. Currently, bolt-on one-piece loading augers and two-piece folding augers are available to reduce the transportation profile of the combine. The bolt-on augers require tools to remove the auger before transport. The two-piece folding augers is quicker to take down and does not require any tools, however it requires a middle bearing which causes higher grain damage, is more expensive and has potentially lower reliability.

SUMMARY

It is an object of the present invention to provide a one-piece loading auger that hinges at its base and has no interruptions in grain flow. This results in less grain damage and higher reliability at a lower cost over a two-piece folding loading auger.

The loading auger of the present invention comprises a tube having auger flighting located therein. The tube is hinged to the transition housing containing the loading auger sump and held in place by two over-center latches. A first portion of each latch is coupled to the tube and the second portion of each latch is coupled to the transition housing. The transition housing is provided with a gear box drive for driving the auger flighting in the tube. The drive and flighting are provided with a coupling for transmitting rotational motion from the drive to the flighting. The coupling automatically disengages when the tube is lowered into its transport position, and automatically engages when the tube is raised into its working position. The coupling comprises a pair of axially extending engagement lugs mounted on the auger flighting and a pair of radially extending lugs mounted on the gearbox drive. The tube is also provided with a rest which engages a shelf formed by an unloading cross auger housing in the grain tank when the loading auger is placed into its transport position.

To facilitate raising and lowering the loading auger, the loading auger is provided with a gas spring for counterbalancing the weight of the loading auger. The gas spring extends between an outwardly extending bracket of the loading auger sump to the tube of the loading auger.

DETAILED DESCRIPTION

Figure 1:
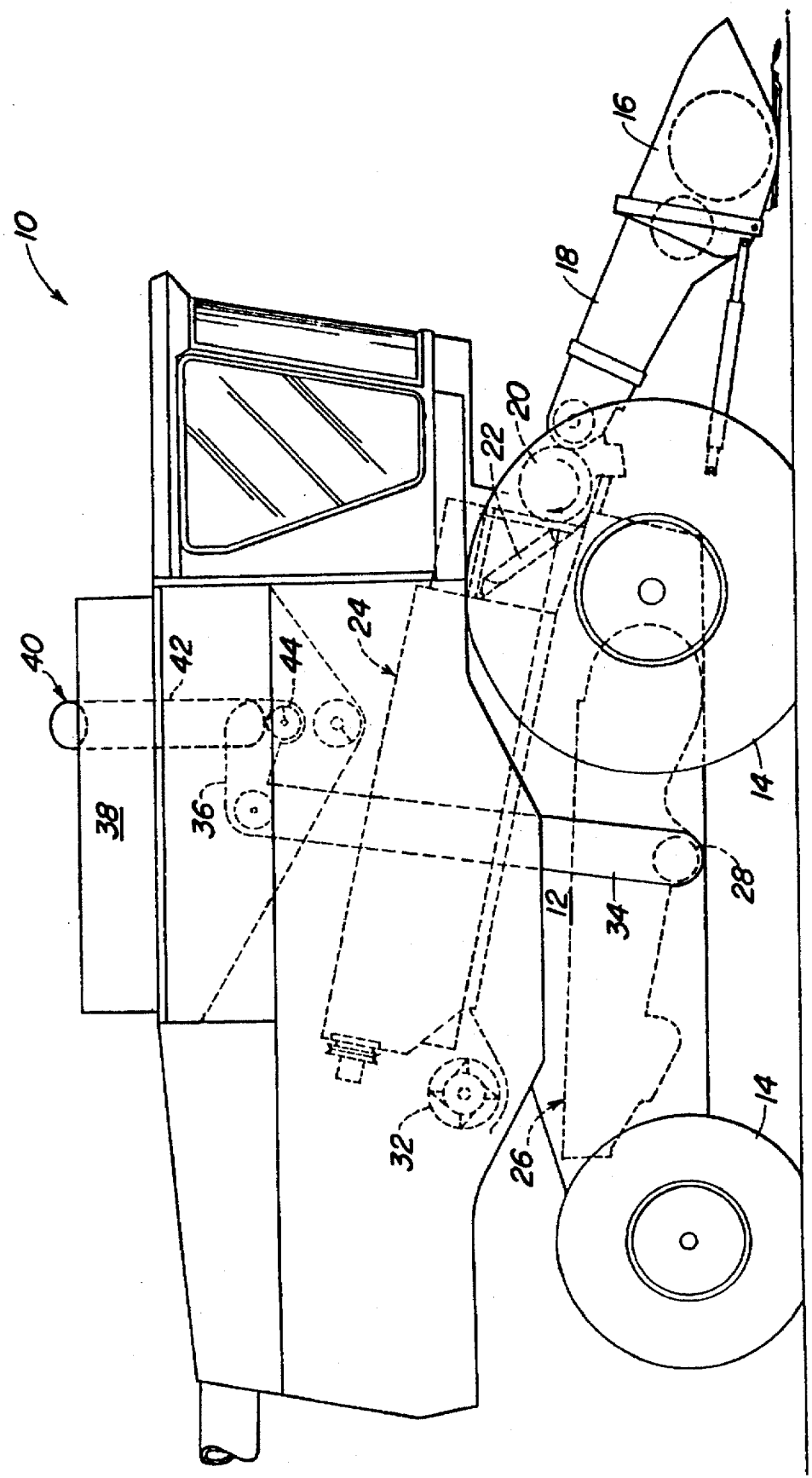
FIG. 1 is a semi-schematic side view of a combine.

FIG. 1 is the side view of a self-propelled agricultural combine 10. The combine comprises a supporting structure 12 having wheels 14 supporting the frame. The supporting structure comprises two axially extending sidesheets between which are located the various crop processing assemblies. Extending forwardly from the combine is a harvesting platform 16 which directs a harvested crop to feederhouse 18. The feederhouse is a conveyor for directing the harvested crop material to the threshing, separating and cleaning assemblies located within the sidesheets of the combine. Although the present invention is disclosed as being mounted on a rotary combine it may also be used on conventional and other combine configurations having a loading auger.

In the illustrated combine, the feederhouse 18 directs the harvested crop to a transverse beater 20 which propels the crop material through an inlet transition section 22 to an axial threshing and separating assembly 24. Grain and chaff are directed from the axial threshing and separating assembly 24 to cleaning assembly 26. The cleaning assembly in turn collects the clean grain at cross auger conveyor 28. The chaff is blown out the rear of the combine by a cleaning fan. Crop material other than grain and chaff is directed by the axial separating unit to transverse beater 32 which propels this material out the rear of the combine.

The cross auger 28 directs the clean grain to one side of the combine to the sump of the clean grain elevator 34. The clean grain elevator 34 lifts the clean grain up to a transition housing 36 containing a loading auger sump. Clean grain entering the transition housing 36 is directed upwardly into the center of the grain tank 38 by loading auger 40. The loading auger comprises a tube 42 and auger flighting 44. The tube is provided with a bearing assembly 46 at its outlet end 48 for rotatively mounting the flighting 44 in the tube 42. The flighting 44 is driven by a coupling 50 comprising a pair of axially extending engagement lugs 52 mounted on the auger flighting 44 and a pair of radially extending lugs 54 mounted to the gearbox drive 56. The coupling 50 automatically disengages when the tube 42 is lowered into its transport position, and automatically engages when the tube 42 is raised into its working position.

Figure 2:
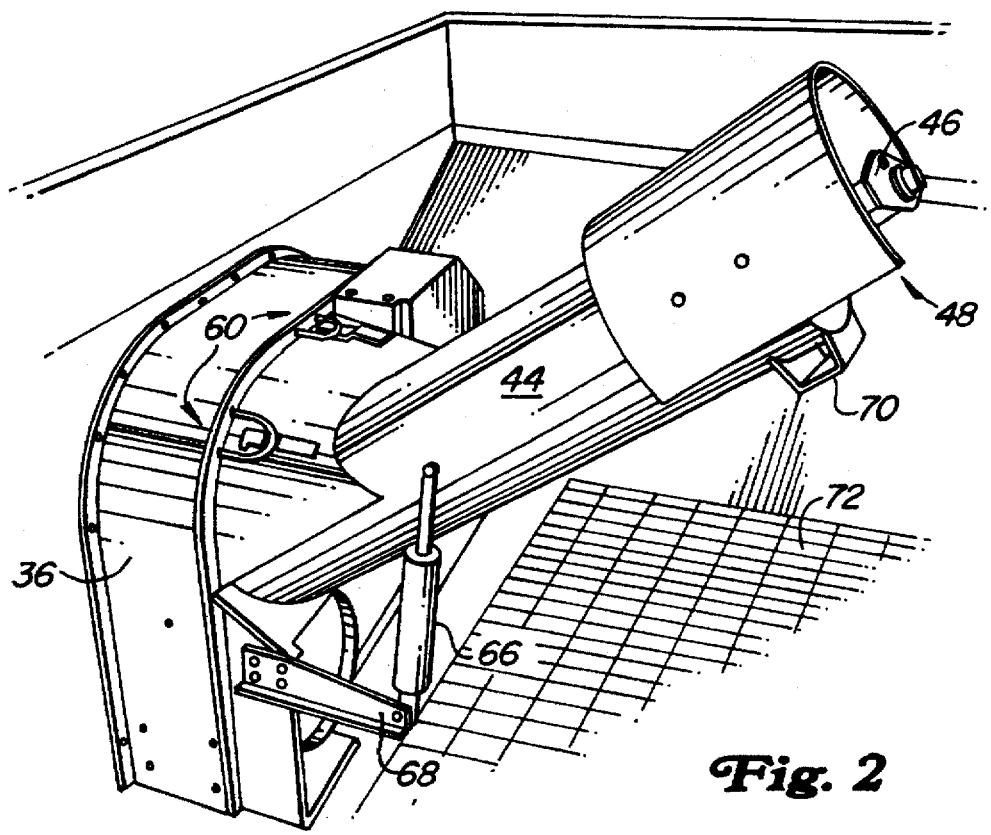
FIG. 2 is a perspective view of the loading auger in its work position
Figure 3:
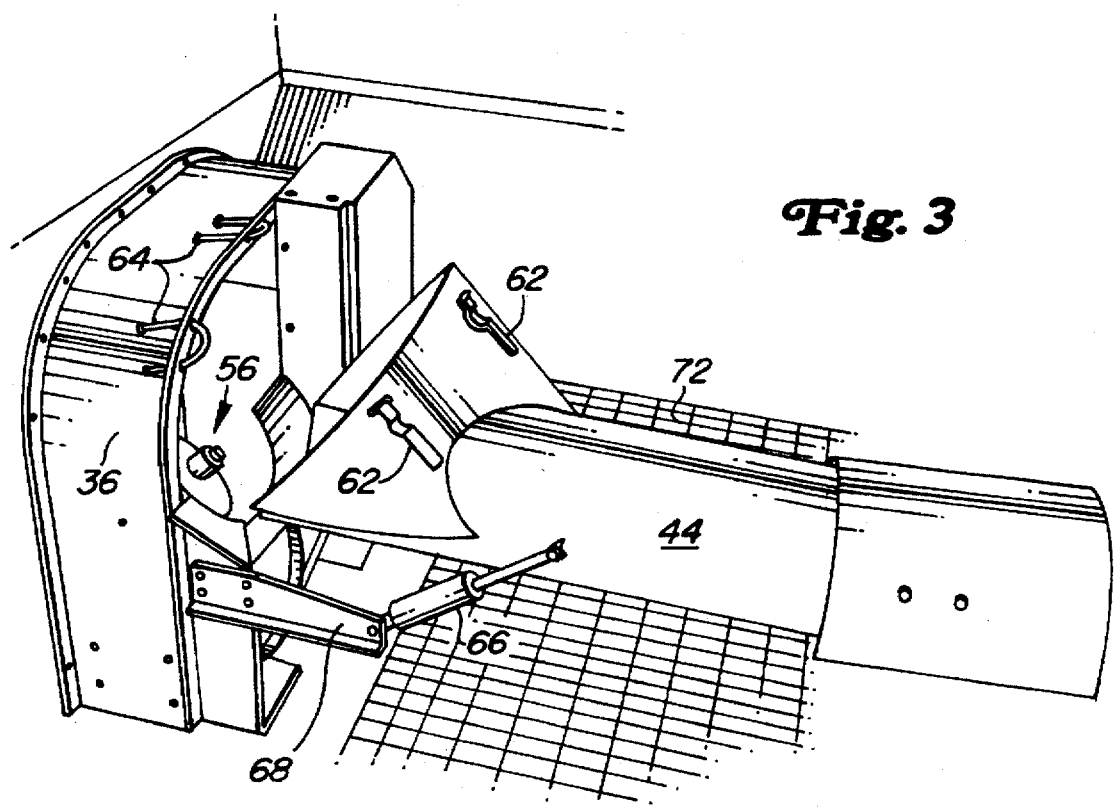
FIG. 3 is a perspective view of the loading auger in its transport position.
Figure 4:
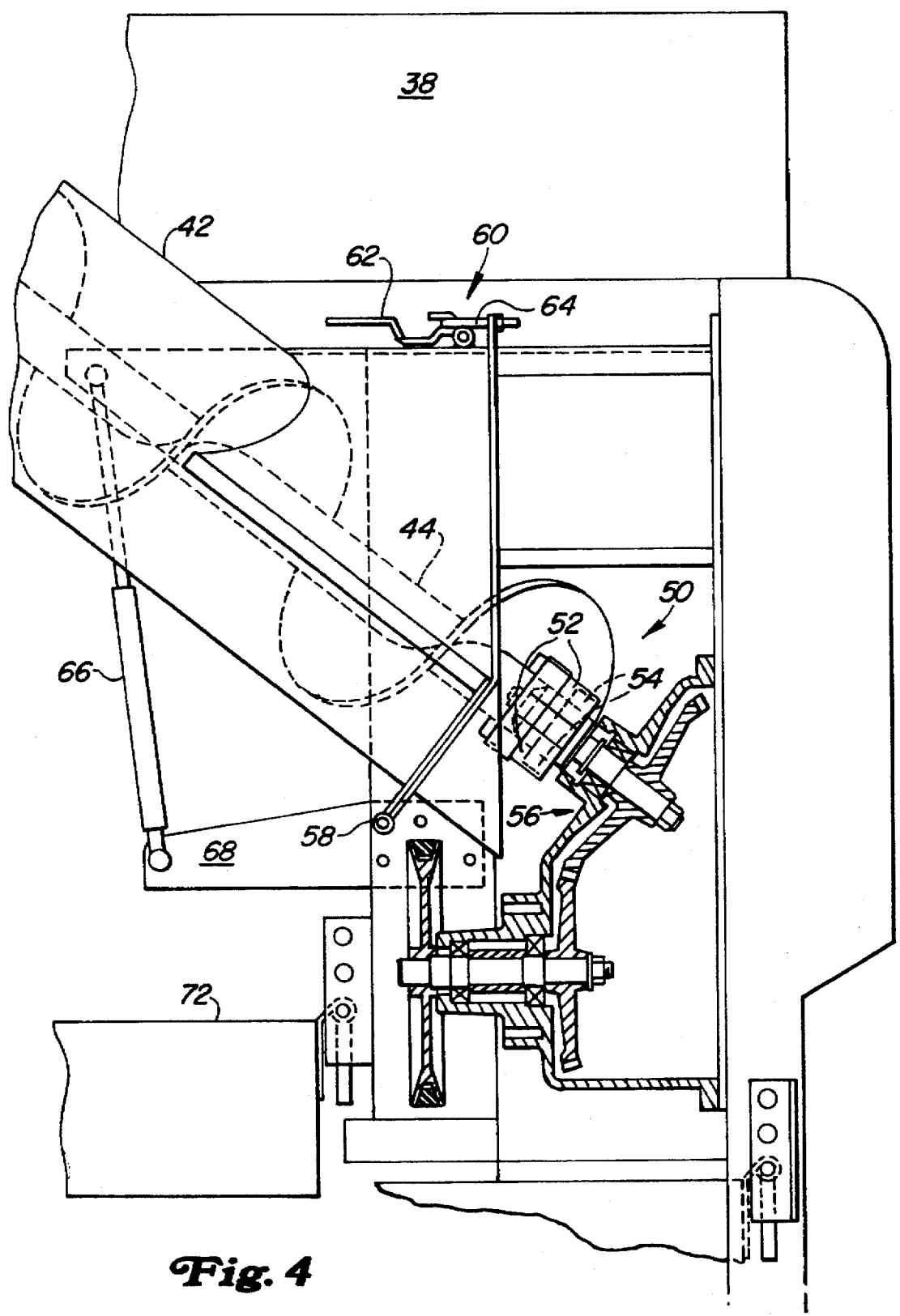
FIG. 4 is a partial cross sectional view of the loading auger.

The loading auger tube 42 is hinged to the transition housing 36 by axially extending pivot 58. As shown in FIGS. 2 and 3, the loading auger 40 can be held in an upwardly extending work position or lowered into a horizontal transport position. In its work position, the loading auger 40 is held in place by two over-center latches 60. A first portion 62 of each latch is coupled to the tube 44 and the second portion 64 of each latch is coupled to the transition housing 36.

To facilitate raising and lowering the loading auger 40, the loading auger 40 is provided with a gas spring 66 for counterbalancing the weight of the loading auger 40. The gas spring 66 extends between an outwardly extending bracket 68 mounted to the transition housing 36 to the tube 44 of the loading auger 40.

The tube 44 is also provided with a rest 70 which engages a shelf 72 formed by an unloading cross auger housing in the grain tank 38 when the loading auger 40 is placed into its transport position.

The loading auger of the present invention should not be limited by the above-described embodiments, but should be limited solely by the claims that follow.

We claim:

1. An agricultural combine for harvesting, threshing, separating and cleaning an agricultural crop, said combine comprising;

a supporting structure;

a grain tank having walls is mounted to the supporting structure for temporarily storing grain;

ground engaging means extending from the supporting structure for transporting the supporting structure across a field;

a threshing assembly for threshing grain from harvested crop material;

a separating assembly for separating grain from the threshed crop; and a cleaning assembly for removing chaff from grain, the cleaning assembly being provided with a clean grain conveyor for collecting and directing the clean grain to a clean grain elevator, the clean grain elevator extends upwardly from the clean grain conveyor to a transition housing containing a loading auger sump, the clean grain elevator lifting grain from the clean grain conveyor to the transition housing, a clean grain loading auger extends from the transition housing into the grain tank for directing grain from the loading auger sump into the grain tank, the loading auger comprises a tube having auger flighting contained therein, the tube having an inlet end adjacent to the loading auger sump, the inlet end being pivotally coupled to the transition housing, a latch having first and second portions, latches the tube into a working position where the loading auger transports grain into the grain tank, the first portion of the latch is mounted on the loading auger and the second portion of the latch is mounted on the transition housing, if the latch is unlatched the loading auger can be pivoted into a transport position where the loading auger is positioned below the walls of the grain tank.

2. A combine as defined by claim 1 wherein the transition housing is provided with a drive for rotating the auger flighting of the loading auger.

3. A combine as defined by claim 2 wherein the auger flighting of the loading auger is provided with an inlet end having a first coupling element which engages a second coupling element on the drive for rotating the auger flighting by the drive.

4. A combine as defined by claim 3 wherein the first and second coupling elements are automatically engaged when the loading auger is in the working position and automatically disengaged when the loading auger is in the transport position.

5. A combine as defined by claim 4 wherein the tube of the loading auger is provided with a rest which engages a shelf in the grain tank when the loading auger is lowered into its transport position.

6. A loading auger for an agricultural combine having a grain tank with walls and a clean grain elevator with a transition housing containing a loading auger sump; the loading auger comprising a tube that is pivotally coupled to the transition housing of the clean grain elevator, the tube having an open inlet end and an open outlet end;

auger flighting rotatably mounted in the tube for transporting grain from the loading auger sump to the grain tank; and a latch for latching the loading auger into a working position whereby the latch is provided with first and second portions, the first portion of the latch is mounted to the tube of the loading auger and the second portion is mounted to the transition housing, if the latch is unlatched the loading auger can be pivoted into its transport position below the walls of the grain tank.

7. A loading auger as defined by claim 6 wherein the transition housing is provided with a drive for rotating the auger flighting of the loading auger.

8. A loading auger as defined by claim 7 wherein the auger flighting of the loading auger is provided with an inlet end having a first coupling element which engages a second coupling element on the drive for rotating the auger flighting by the drive.

9. A loading auger as defined by claim 8 wherein the first and second coupling elements are automatically engaged when the loading auger is in the working position and automatically disengaged when the loading auger is in the transport position.

10. A loading auger as defined by claim 9 wherein the tube of the loading auger is provided with a rest for engaging a shelf in the grain tank of a combine when the loading auger is lowered into its transport position.

* * * * *